US006526774B1

(12) United States Patent
Lu et al.

(10) Patent No.: US 6,526,774 B1
(45) Date of Patent: Mar. 4, 2003

(54) DEVICE FOR SEPARATING DRY SOLID AND LIQUID BY COOLING SPRAY

(76) Inventors: Shun-Tsung Lu, 160-2, Fu-Hsing Road Section 2, Taichung (TW); Ta-Wei Lu, 2719 E. Belmont Ct., Brea, CA (US) 92621

(*) Notice: Subject to any disclaimer, the term of this patent is extended or adjusted under 35 U.S.C. 154(b) by 0 days.

(21) Appl. No.: 09/928,690

(22) Filed: Aug. 14, 2001

(51) Int. Cl.[7] .................................................. F25D 5/00
(52) U.S. Cl. ............................................. 62/304; 62/74
(58) Field of Search ................................ 62/69, 70, 74, 62/304

(56) References Cited

U.S. PATENT DOCUMENTS 3,024,117 A * 3/1962 Barlow .......................... 62/74
3,404,541 A * 10/1968 Bot-Langlet .................. 62/74
5,564,289 A * 10/1996 Hino ............................ 62/74

* cited by examiner

*Primary Examiner*—Ronald Capossela
(74) *Attorney, Agent, or Firm*—Rosenberg, Klein & Lee

(57) ABSTRACT

A device for separating dry solid and liquid by cooling spray has a material reservoir which can adjust and control low temperature for preserving material, a high-pressure pump for extracting material to high-pressure sprayer. Besides, material is pressurized to become a spray state for spraying by adjusting a nozzle of the high-pressure sprayer, and then dry air having high temperature can form a circulating cycle in the steel tub via a heat exchanger of a gas-drying machine to make water content of a spray of liquid be absorbed by dry air having high temperature such that original material becomes powder solid. Besides, air inside the steel tub absorbs much water content due to heat exchange, and then the air with much water content and high temperature is cooled via the heat exchanger when passing through an air filter. After water content of the air is condensed, the air is reheated for using in next cycle.

7 Claims, 6 Drawing Sheets

DEVICE FOR SEPARATING DRY SOLID AND LIQUID BY COOLING SPRAY

BACKGROUND OF THE INVENTION

1. Field of the Invention

The present invention relates to a device for separating dry solid and liquid by cooling spray, especially to a new one enabling be applied to material, such as sewage and foods, extraction technologies which are hard to be processed in nowadays industry.

2. Description of the Prior Art

Commonly used technology of processing scrap has a feature: scrap produced by industry or material of industry has to be put into outside precipitating tanks to precipitate slowly one tank by one tank, or is gathered to a percolator after spraying and percolating by a spray head and then be extracted to another percolator to percolate. Disadvantages resulted from methods described above are:

1. Wasting time: Because precipitating tanks require to be solarized under sunshine enormously to use sunshine to vaporize vapor to get a solid state, too long time is usually wasted such that efficacy doesn't satisfy industry times nowadays. Besides, the products of the method may vary due to change of the weather.
2. Increasing cost: A vacancy with a certain range is required, so business cost is increased.
3. Polluting environment: sewage of industry may spoil due to temperature of environment during placing in tubs such that the process becomes more difficult or the content in tubs produces a peculiar smell and easily produces an evaporated poisonous gas to result in second environmental pollution. Extraction of foods or medicine is the same. In addition, if the process is only to precipitate material, the material which is difficult to process can't be purified absolutely.
4. Poor ability of keeping warmth: Because the steel tub is made of metal material, thermal conductivity is higher than common heat insulators such that heat exchange between air and the material is not entire according to that the temperature of the steel tub is easily lowered due to surrounding air flowing. Besides, the steel tub easily has too high temperature and thus staffs could be scaled.
5. Deforming easily: The surface of the steel tub is smooth in the past, and is easy to deform due to high temperature such that the using time limit is shortened.

The inventor of the present invention ruminated over the disadvantages resulted from the habitually used technology described above, and earnestly deliberated the way of improvement and innovation. After studying hard for a long period, the inventor eventually succeeded in inventing the present invention, a device for separating dry solid and liquid by cooling spray.

SUMMARY OF THE INVENTION

The first purpose of the present invention is to provide a device for separating dry solid and liquid by cooling spray, which is applied to separate scrap produced by nowadays industry or material of foods.

The second purpose of the present invention is to provide a device for separating dry solid and liquid by cooling spray, which has the function of recycling and preserving material.

The third purpose of the present invention is to provide a device for separating dry solid and liquid by cooling spray, which can arise the whole separating speed of material to increase the efficiency.

The forth purpose of the present invention is to provide a device for separating dry solid and liquid by cooling spray, which provides a low-temperature reservoir to preserve the material first such that the material wouldn't vaporize quickly or spoil because of affection of the normal atmospheric temperature or high temperature before processing to produce second pollution such as poisonous gas may damage health of human or pollute environment.

The other purpose of the present invention is to provide a device for separating dry solid and liquid by cooling spray, which can make the steel tab maintain under a certain working temperature, and can provide a space which doesn't deform easily due to high temperature.

A device for separating dry solid and liquid by cooling spray which can achieve the purposes described above comprises: a material reservoir in which low temperature can be adjusted and controlled, a high-pressure sprayer, and a heat exchanger. The device is to replace the water content of a spray of liquid in the steel with dry air having high temperature to make the material become dry powder in solid state such that the purpose of collecting is achieved.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

A device for separating dry solid and liquid by cooling spray provided from the present invention is to make liquid scrap causing pollution or material of foods produced by industry pass through the device and separated into powder solid and liquid for follow-up process.

Figure 1A:
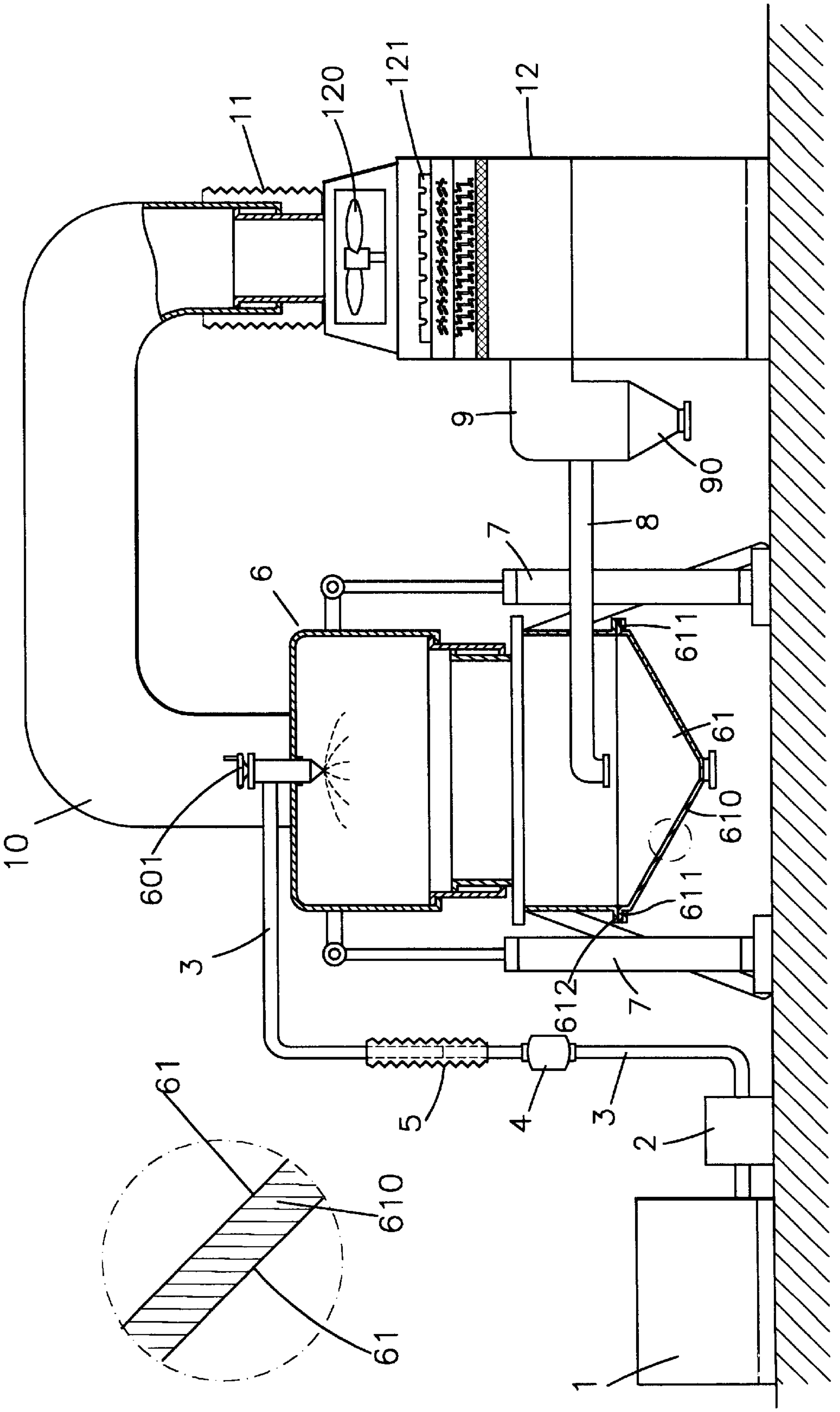
FIG. 1A is the exemplary view of the present invention, a device for separating dry solid and liquid by cooling spray.
Figure 1B:
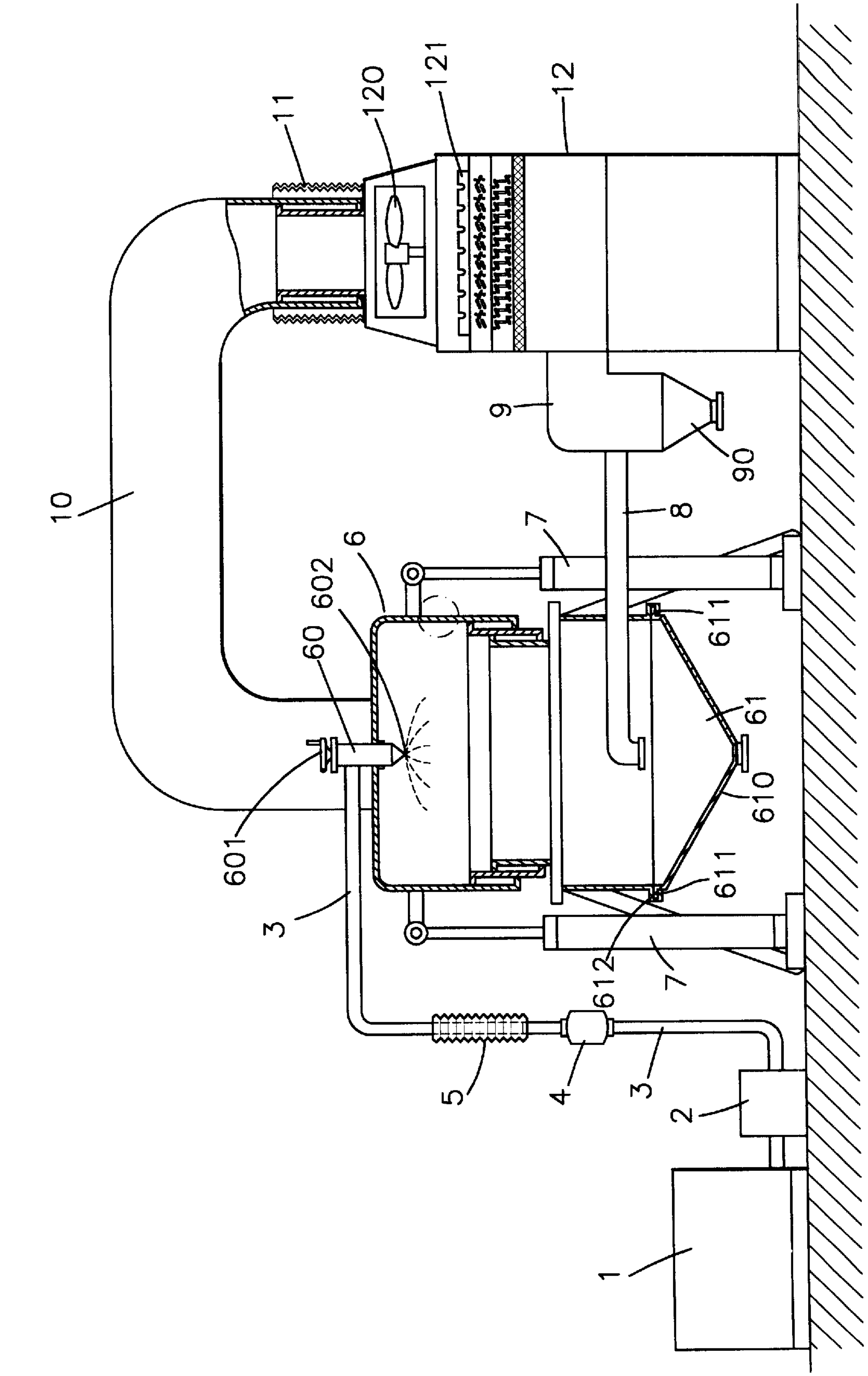
FIG. 1B is the exemplary view of the present invention, a device for separating dry solid and liquid by cooling spray.
Figure 1C:
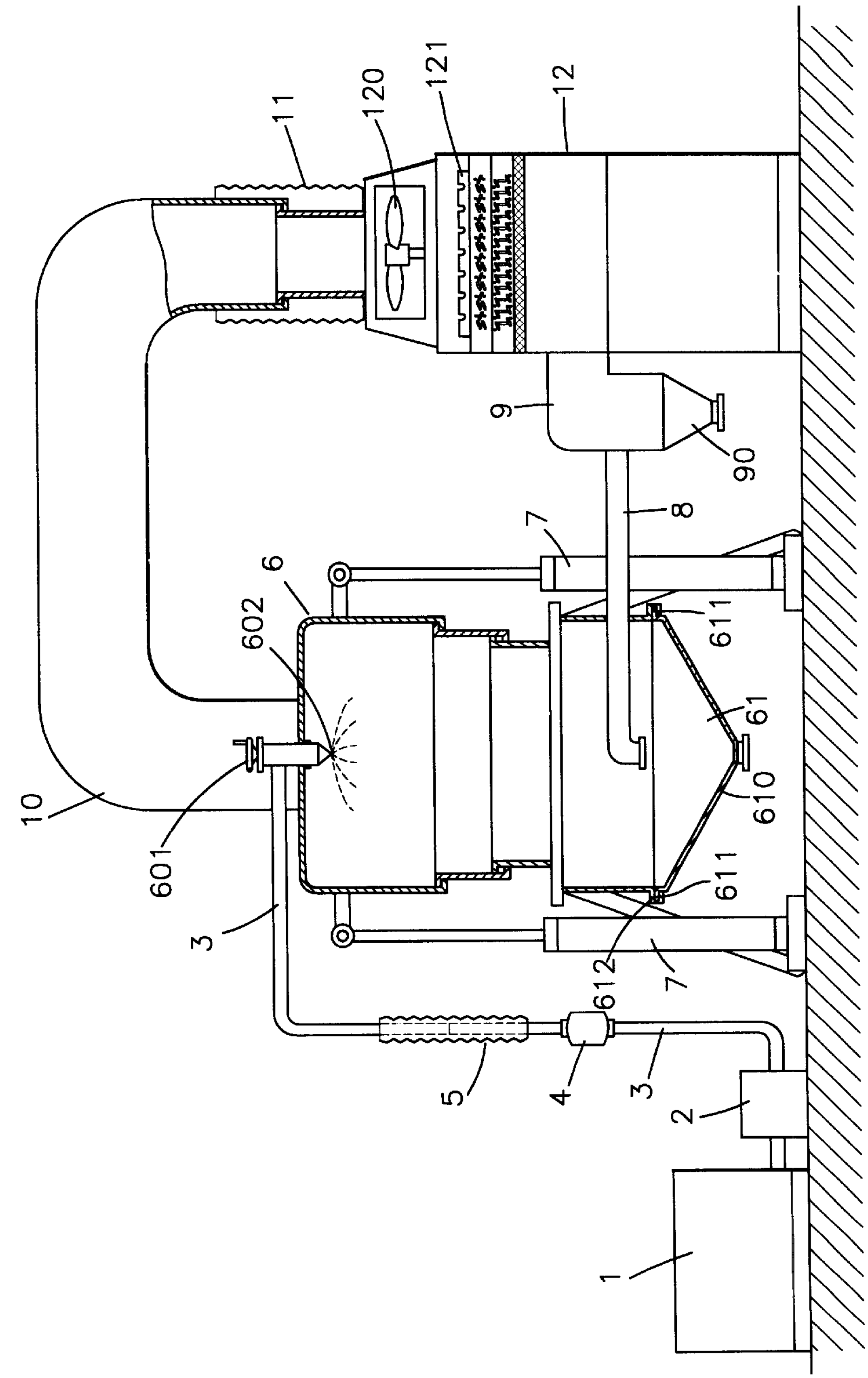
FIG. 1C is the exemplary view of the present invention, a device for separating dry solid and liquid by cooling spray.

Referring to FIG. 1A, FIG. 1B, FIG. 1C, the device mainly comprises: a material reservoir 1 pumping liquid material via a high-pressure pump 2, a guide pipe 3 for transporting material to the high-pressure sprayer 60 in the steel tub 6 for liberation, and a check valve 4 is placed at the middle portion of the guide pipe 3 to avoid backflow phenomenon of the material during transport process because of power or other overpowering factors which may increase opportunity of a breakdown of a machine. Besides, in order to increase usage efficiency of the machine, the steel tub 6 can be moved up or down, and a first flexible pipe 5 and a second flexible pipe 11 are respectively set at the proper part of guide pipe 3 and a first exhaust pipe 10 to work in coordination with motion of the steel tub 6.

When the material is transported to the high-pressure sprayer 60 via the guide pipe 3, a control valve 601 can be adjusted to control the nozzle 602 for adding pressure to promote spraying the material such that the material changes into a spray of liquid due to the control nozzle 602 and pressure, and the material is sprayed inside the steel tub 6. Then dry air having high temperature produced by the heat transferring device 121 of the heat exchanger 12 is transported to the first exhaust pipe 10 via the heat air fan 120 to enter the steel tub 6 such that the spray of liquid can mix with the air together to make the water content of the spray of the liquid absorb saturated heat for vaporizing because of dry air having high temperature. Then, vaporized steam can be transported to the air filter 9 for condensation via a second exhaust pipe 8. The spray of liquid is changed into dry powder solid falling into the first material trough 61 because the water content is vaporized.

In addition, the steel tub 6 made of metal which is the material with extra high heat conductivity making the steel tub 6 maintain a certain working temperature such that the material and air can proceed heat exchange smoothly. Therefore, a foam 62 is set at the inner surroundings of the steel tub 6 to provide the function of keeping warmth.

Mixing the dry air having high temperature and water content of the spray of liquid in the steel tub 6 results in air having high temperature and much water content, so water content of the air having high temperature and much water content is separated through cooling the air via the cooling effect of the heat exchanger 12 after the air flows to the air filter 9 through the second exhaust pipe 8. Then the water content flows to a second material trough 90 to make the air having high temperature and much water content become dry air having normal temperature.

After water content is condensed and be moved away, the air is transported again to the heat transferring device 121 of the heat exchanger 12 to be warmed up to change into dry air having high temperature. Besides, a heat air fan 120 transports again dry air having high temperature through the exhaust pipe 10 to the steel tub 6 for another cycle.

Figure 2:
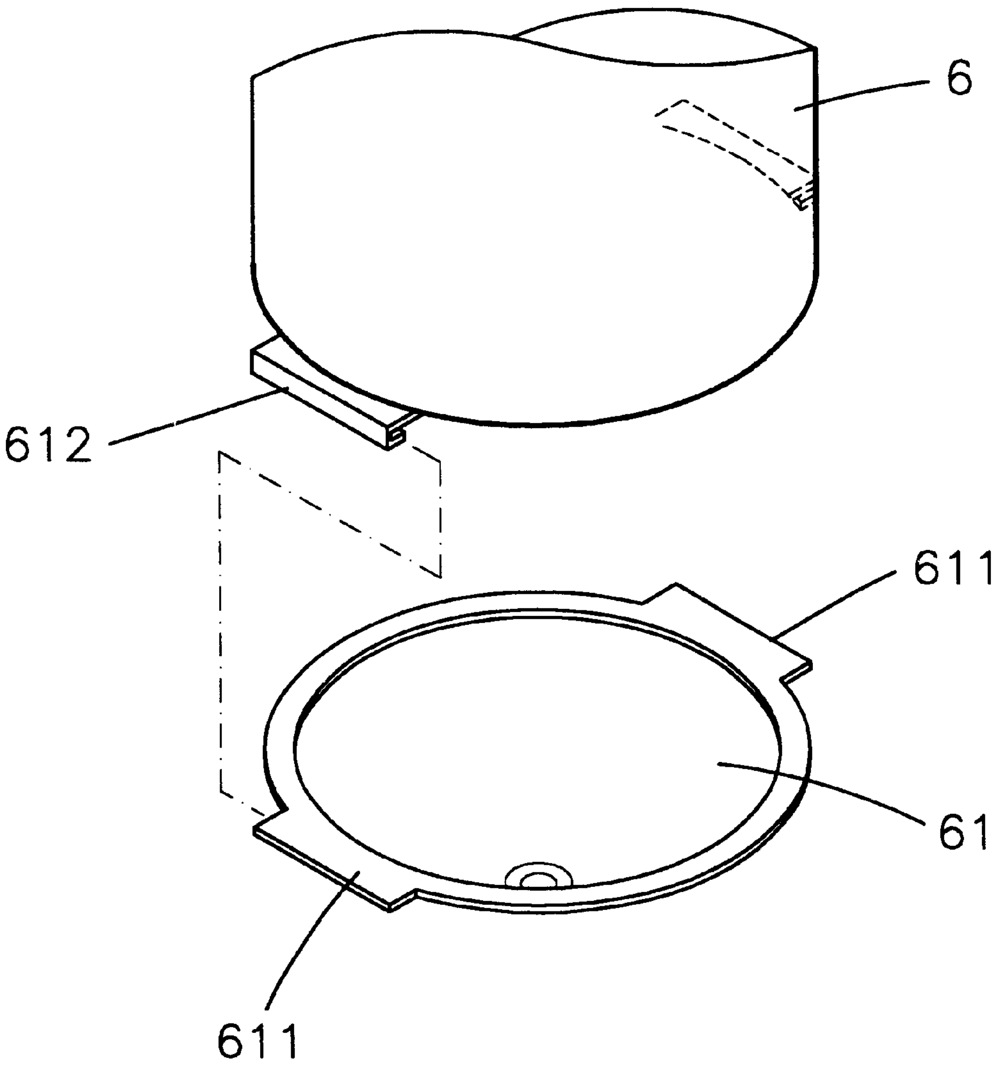
FIG. 2 is the exploded view of material trough of the present invention, a device for separating dry solid and liquid by cooling spray.

Besides, a circulating cooling system composed of a plurality of hollow partitions 610 are distributed at the lateral part of the hollow inclined plane inside the steel blade of the first material trough 61 at the bottom of the steel tub 6 to lower the temperature of falling powder having high temperature such that the powder is not easy to attach to the inclined plane of both sides to reduce difficulty of collection. Referring to FIG. 2, a pair of fixing flanges 611 is set at both sides of top of the inclined plane of the first material trough 61 to clip with a pair of clipping slots 612 of the steel tub 6. In addition, a space is provided for cleaning the inner wall of the steel tub 6 and replacing the first material trough 61.

The steel tub 6 is composed of three parts inlayed together to match different drying time for different size of pellet of the material inside the material reservoir 1. A pair of oil-pressure cylinder 7 attached to both sides of the steel tub 6 can be adjusted properly to move upward or downward to increase or decrease the usage room of the steel tub 6 for most benefits.

Figure 3A:
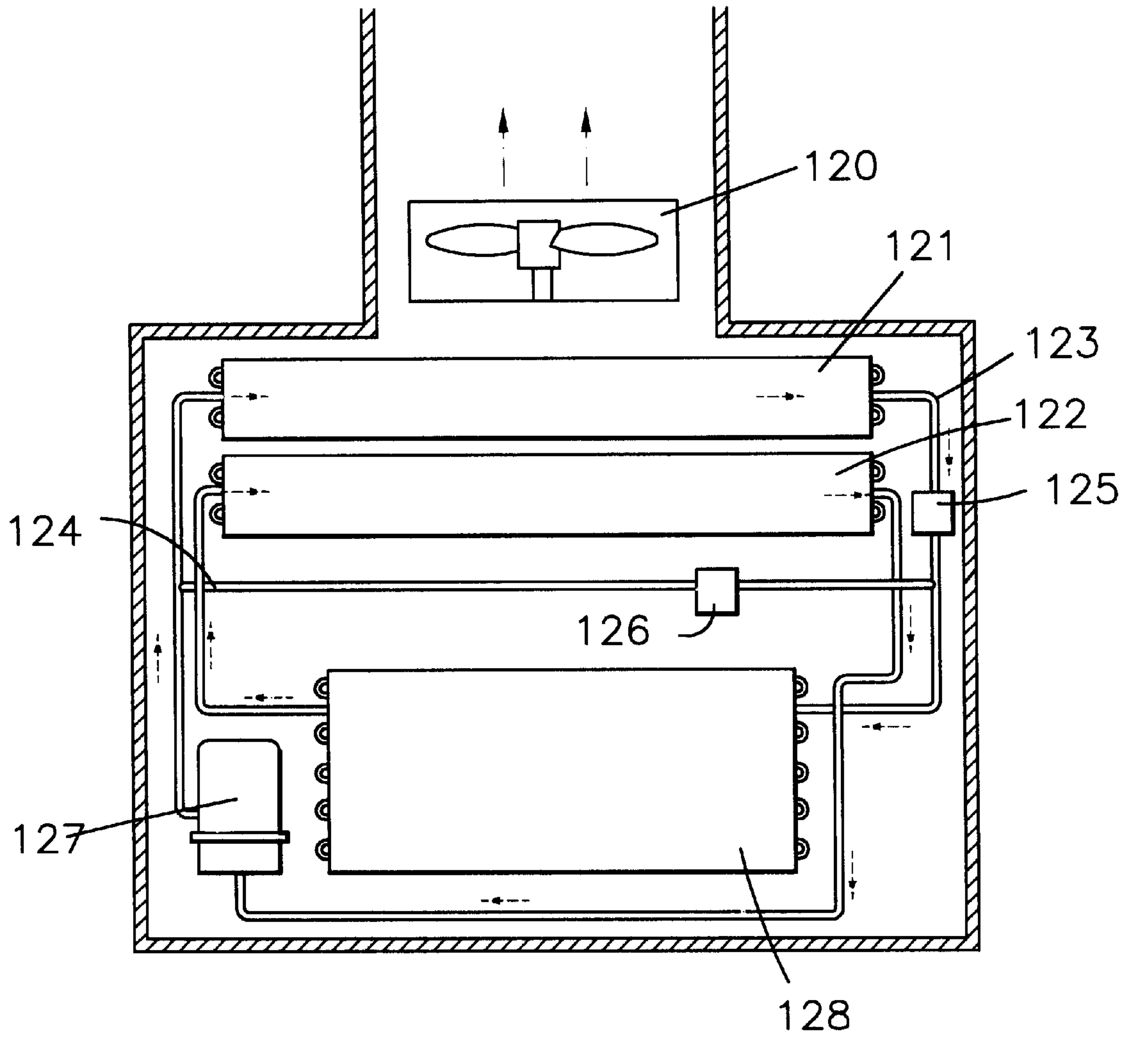
FIG. 3A is exemplary diagram of the habitually used cooling system technology.

Referring to FIG. 3A, when heating starts or the temperature inside the steel tub 6 is lower than a set value, a first electromagnetic valve 125 is turned on and a second electromagnetic valve 126 is turned off to make a first pipe 123 can be freely passed through while a second pipe 124 is interdicted. The coolant compressed by the compressor 127 first flows through the heat transferring device 121 to proceed first heat exchange with the air inside the first exhaust pipe 10. The coolant then passes through the first pipe 123 and the first electromagnetic valve 125 to be cooled inside the air-cooled heat sink 128. Then the coolant is transported into a cool transferring device 122 for second heat exchange with the air inside the exhaust pipe. The coolant flowed from the cool transferring device 122 flows back to the compressor 127 via pipes for finishing the first cycle of heat exchange.

Figure 3B:
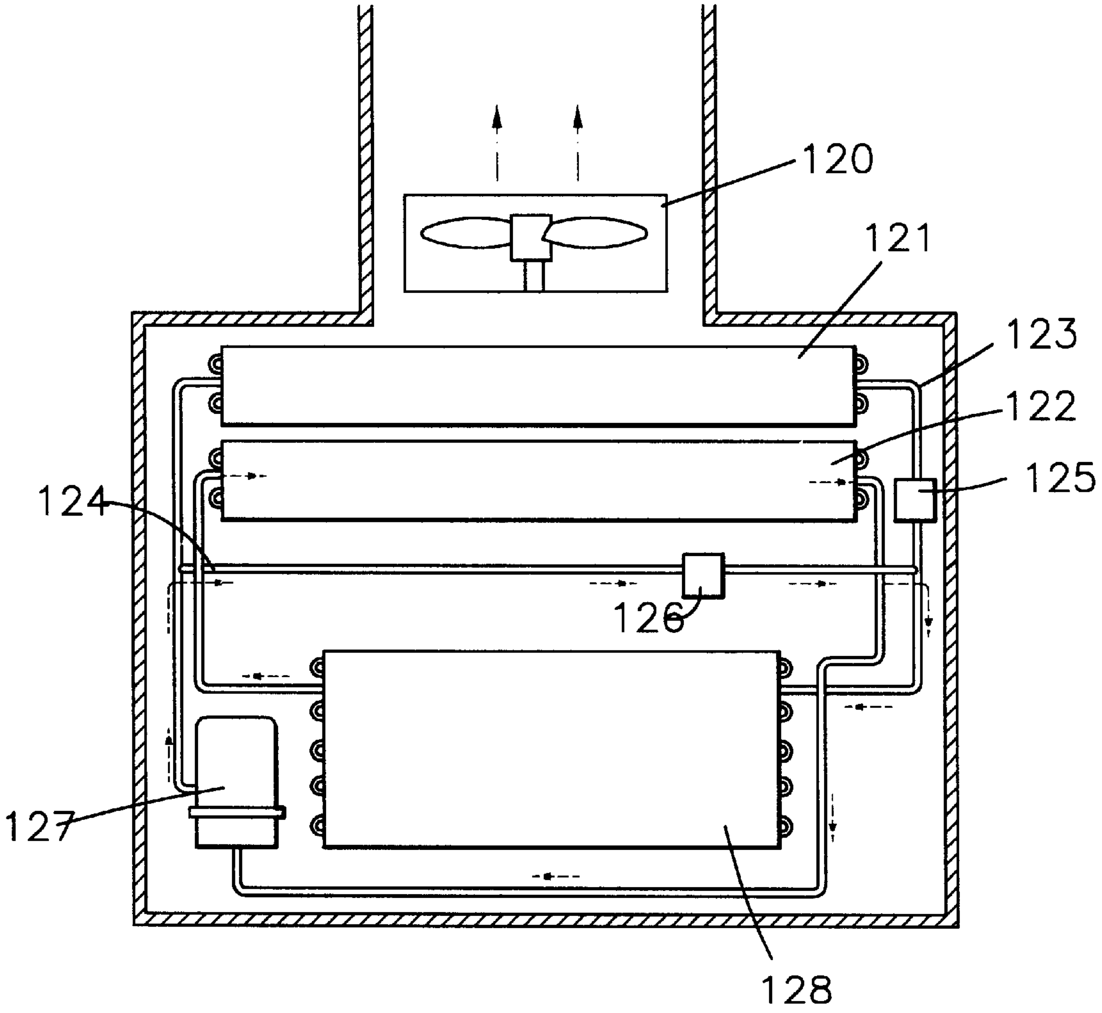
FIG. 3B is exemplary diagram of the habitually used cooling system technology.

As shown in FIG. 3B, when the temperature inside the steel tub 6 is higher than a set value, the second electromagnetic valve 126 is turned on and the first electromagnetic valve 125 is turned off to make the second pipe 124 free for flowing while the pipe 123 is interdicted. The coolant compressed by the compressor 127 flows along the direction of arrow shown in the FIG. 3B, and passes through the second pipe 124 and the second electromagnetic valve 126 to enter the air-cooled heat sink 128 for lowering temperature, and then the coolant is transported into the cool transferring device 122 for heat exchange with air inside the first wine inlet pipe 10. The coolant flowing from the cool transferring device 122 flows back to the compressor 127 via pipes for finishing a second cycle of heat exchange.

According to what described above in FIG. 3A and FIG. 3B, two alternate sets of heat exchange cycle can make the steel tub 6 keep temperature an almost constant.

Comparing with the quoted case described above and other habitually used technologies, a device for separating dry solid and liquid by cooling spray provided from the present invention has following advantages:

1. Economizing the use of room: A wide vacant land is not essential such that management is more convenient and some torment such as demanded land is reduced.
2. Increasing economic efficiency: Reducing time for dry and other indeterminate factors increases both producing quantity and quality for adding efficiently economic benefit and efficiency.
3. Conforming with environment protection: For example, the technology described above can be applied to sewage process in industry to separate material, and the separated products are more convenient for processing follow-up environmental protection questions. Besides, for food industry, the technology can be also applied to extraction of foods and medicine to make preservation and collection easier.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A device for separating dry solid and liquid by a cooling spray, comprising:

a pair of flexible pipes defining first and second flexible pipes;

a high pressure sprayer having a nozzle, said nozzle producing a liquid spray;

a reservoir for containing a material for separation;

a guide pipe having first and second ends, said first end being connected to said reservoir, said second end being connected to said high pressure sprayer, said first flexible pipe being fixedly secured to said guide pipe to selectively extend said guide pipe;

a high-pressure pump having an outlet coupled to said guide pipe and an inlet connected to said reservoir, said high pressure pump forcing said material from said reservoir through said guide pipe to said high pressure sprayer;

a check valve being connected between said outlet of said high pressure pump and said guide pipe, said check valve preventing a back flow of said material through said guide pipe;

a steel tub having said high pressure sprayer mounted thereto for mixing said liquid spray with dry air; said steel tub including a trough for collecting dry solid materials that precipitate out of said mixture of said liquid spray and said dry air, said steel tub including a pair of adjustable oil pressure cylinders respectively mounted on opposing sides of said steel tub for adjusting a height and capacity thereof;

a thermal insulation cushion mounted to said steel tub;

a heat exchanger for producing said dry air, said heat exchanger communicating with said steel tub through a first exhaust pipe, said first exhaust pipe having a first end connected to said steel tub, and a second end connected to said heat exchanger, said second flexible pipe being fixedly secured to said first exhaust pipe to selectively extend said first exhaust pipe in cooperation with adjustment of mid-height of said steel tub; and, an air filter coupled between said steel tub and said heat exchanger for condensing water from air from said steel tub, said air from said steel tub being transported from said steel tub to said air filter through a second exhaust pipe.

2. The device for separating dry solid and liquid by a cooling spray as recited in claim 1, wherein said reservoir includes a circulating cooling system.

3. The device for separating dry solid and liquid by a cooling spray as recited in claim 1, further comprising a plurality of high-pressure sprayers.

4. The device for separating dry solid and liquid by a cooling spray as recited in claim 1, wherein said oil-pressure cylinders include a chain driven by a power source.

5. The device for separating dry solid and liquid by a cooling spray as recited in claim 1, wherein said steel tub includes a plurality of tubular sections telescoped together to change said capacity of said steel tub responsive to a change in said height of said steel tub.

6. The device for separating dry solid and liquid by a cooling spray as recited in claim 1, wherein said thermal insulation cushion is formed of a foam.

7. The device for separating dry solid and liquid by a cooling spray as recited in claim 1, wherein a plurality of hollow partitions are disposed at a hollow inclined plane within a steel blade of said trough.

* * * * *